(12) United States Patent
Yanagida et al.

(10) Patent No.: US 12,545,062 B2
(45) Date of Patent: Feb. 10, 2026

(54) TIRE MANAGEMENT DEVICE, PROGRAM, AND TIRE MANAGEMENT METHOD

(71) Applicant: BRIDGESTONE CORPORATION, Tokyo (JP)

(72) Inventors: Shuzo Yanagida, Tokyo (JP); Daisuke Sato, Tokyo (JP); Hiroki Yasuda, Tokyo (JP); Takanori Karube, Tokyo (JP); Shunsuke Sentoku, Tokyo (JP); Tomoaki Miyoshi, Tokyo (JP); Eri Harada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 66 days.

(21) Appl. No.: 18/695,355

(22) PCT Filed: Jun. 1, 2022

(86) PCT No.: PCT/JP2022/022380
§ 371 (c)(1),
(2) Date: Mar. 26, 2024

(87) PCT Pub. No.: WO2023/079781
PCT Pub. Date: May 11, 2023

(65) Prior Publication Data
US 2025/0128549 A1    Apr. 24, 2025

(30) Foreign Application Priority Data
Nov. 5, 2021   (JP) .................................. 2021-181501

(51) Int. Cl.
*B60C 23/04*   (2006.01)
(52) U.S. Cl.
CPC ...... *B60C 23/0416* (2013.01); *B60C 23/0479* (2013.01)

(58) Field of Classification Search
CPC ............ B60C 23/0416; B60C 23/0479; B60C 23/0408
(Continued)

(56) References Cited

U.S. PATENT DOCUMENTS

| | | | |
|---|---|---|---|
| 6,404,330 B1 | 6/2002 | Sugisawa | |
| 6,441,727 B1 * | 8/2002 | LeMense | ............ B60C 23/0416 340/447 |

(Continued)

FOREIGN PATENT DOCUMENTS

| | | | |
|---|---|---|---|
| JP | 2002081945 A | 3/2002 | |
| JP | 2005138685 A | 6/2005 | |

(Continued)

OTHER PUBLICATIONS

Oct. 10, 2024, search result of the Extended European Search Report issued by the European Patent Office in the corresponding European Patent Application No. 22889606.4.

(Continued)

*Primary Examiner* — Eric Blount
(74) *Attorney, Agent, or Firm* — KENJA IP LAW PC (57) ABSTRACT

A tire management device (10) includes: an information acquisition section (131) that acquires mounted position information indicating a mounted position of a tire on a vehicle (20) and mounted tire information that is information on the state of the tire including internal pressure; a determination section (132) that determines an abnormal internal pressure of the tire based on the mounted tire information; and a notification section (133) that outputs the mounted position and an abnormal internal pressure determination result of the tire that has been determined to have an abnormal internal pressure to a notification destination.

6 Claims, 5 Drawing Sheets

(58) Field of Classification Search
USPC .......................................................... 340/445
See application file for complete search history.

(56) References Cited

U.S. PATENT DOCUMENTS

| | | | |
|---|---|---|---|
| 7,111,507 B2 | 9/2006 | Fennel et al. | |
| 8,279,055 B2* | 10/2012 | Isomura | B60C 23/0408 340/447 |
| 2003/0227380 A1* | 12/2003 | Piech | B60C 23/061 340/443 |
| 2004/0031317 A1* | 2/2004 | Norimatsu | B60C 23/0416 73/146.4 |
| 2004/0090324 A1 | 5/2004 | Hayashi et al. | |
| 2016/0297263 A1* | 10/2016 | Watanabe | B60C 23/0489 |

FOREIGN PATENT DOCUMENTS

| | | | |
|---|---|---|---|
| JP | 2005519274 A | 6/2005 |
| JP | 2006011981 A | 1/2006 |
| JP | 2009234298 A | 10/2009 |
| JP | 2011102082 A | 5/2011 |
| JP | 2021067533 A | 4/2021 |
| WO | 0059742 A1 | 10/2000 |

OTHER PUBLICATIONS

Jul. 26, 2022, International Search Report issued in the International Patent Application No. PCT/JP2022/022380.
May 2, 2024, International Preliminary Report on Patentability issued in the International Patent Application No. PCT/JP2022/022380.

* cited by examiner

| VEHICLE | TIRE | MOUNTED POSITION INFORMATION | MOUNTED TIRE INFORMATION | | | LOAD INFORMATION |
| --- | --- | --- | --- | --- | --- | --- |
| | | | INTERNAL PRESSURE | TEMPERATURE | PRESSURE DROP RATE | |
| A001 | 1 | REAR LEFT OUTSIDE WHEEL | ***[kPa] | ***[°C] | *** | |
| | 2 | REAR LEFT INSIDE WHEEL | ***[kPa] | ***[°C] | *** | |
| | ... | ... | ... | ... | ... | |
| | 6 | FRONT RIGHT WHEEL | ***[kPa] | ***[°C] | *** | ***[t] |
| B001 | 1 | REAR LEFT OUTSIDE WHEEL | ***[kPa] | ***[°C] | *** | |
| | 2 | REAR LEFT INSIDE WHEEL | ***[kPa] | ***[°C] | *** | ***[t] |
| | | | | | ⋮ | |

FIG. 5

TIRE MANAGEMENT DEVICE, PROGRAM, AND TIRE MANAGEMENT METHOD

TECHNICAL FIELD

The present disclosure relates to a tire management device, a program, and a tire management method.

BACKGROUND

Conventionally, systems are known that are installed in vehicles to detect and warn of undesired pressure drops in tires. For example, Patent Literature (PTL) 1 describes a temperature compensation method in such a tire pressure monitoring system.

CITATION LIST

Patent Literature

PTL 1: JP 2005-519274 A (publication in Japan of WO 2003/074299 A1).

SUMMARY

Technical Problem

Abnormal internal pressure of a tire may occur and a driver may receive an alarm (warning) from an in-vehicle system. However, the in-vehicle system may issue a precautionary alarm without providing details of the abnormal internal pressure of the tire. As a result, the driver may find it difficult to judge whether emergency maintenance is needed or whether vehicle operation may continue. Further, a vehicle operations manager may also find it difficult to judge whether vehicle operation may continue in the event of abnormal internal pressure of a tire.

In view of such circumstances, it would be helpful to provide a tire management device, a program, and a tire management method capable of notification of abnormal internal pressure of a tire such that judging whether or not vehicle operation may continue is made easier.

Solution to Problem

According to an embodiment of the present disclosure, a tire management device comprises: an information acquisition section configured to acquire mounted position information indicating a mounted position of a tire on a vehicle and mounted tire information that is information on the state of the tire, including internal pressure; a determination section configured to determine abnormal internal pressure of the tire based on the mounted tire information; and a notification section configured to output the mounted position and an abnormal internal pressure determination result of the tire that has been determined to have an abnormal internal pressure to a notification destination.

According to an embodiment of the present disclosure, a program causes a tire management device to execute: acquiring mounted position information indicating a mounted position of a tire on a vehicle and mounted tire information that is information on the state of the tire, including internal pressure; determining abnormal internal pressure of the tire based on the mounted tire information; and outputting the mounted position and an abnormal internal pressure determination result of the tire that has been determined to have an abnormal internal pressure to a notification destination.

According to an embodiment of the present disclosure, a tire management method executed by a tire management device includes: acquiring mounted position information indicating a mounted position of a tire on a vehicle and mounted tire information that is information on the state of the tire, including internal pressure; determining abnormal internal pressure of the tire based on the mounted tire information; and outputting the mounted position and an abnormal internal pressure determination result of the tire that has been determined to have an abnormal internal pressure to a notification destination.

Advantageous Effect

According to the present disclosure, a tire management device, a program, and a tire management method are provided that are capable of notification of an abnormal internal pressure of a tire such that judging whether or not vehicle operation may continue is made easier.

DETAILED DESCRIPTION

The following describes a tire management device and a tire management method according to an embodiment of the present disclosure, with reference to the drawings. In each drawing, identical or equivalent parts are marked with the same reference sign. In description of the present embodiment, description of identical or equivalent parts is omitted or simplified as appropriate.

Figure 1:
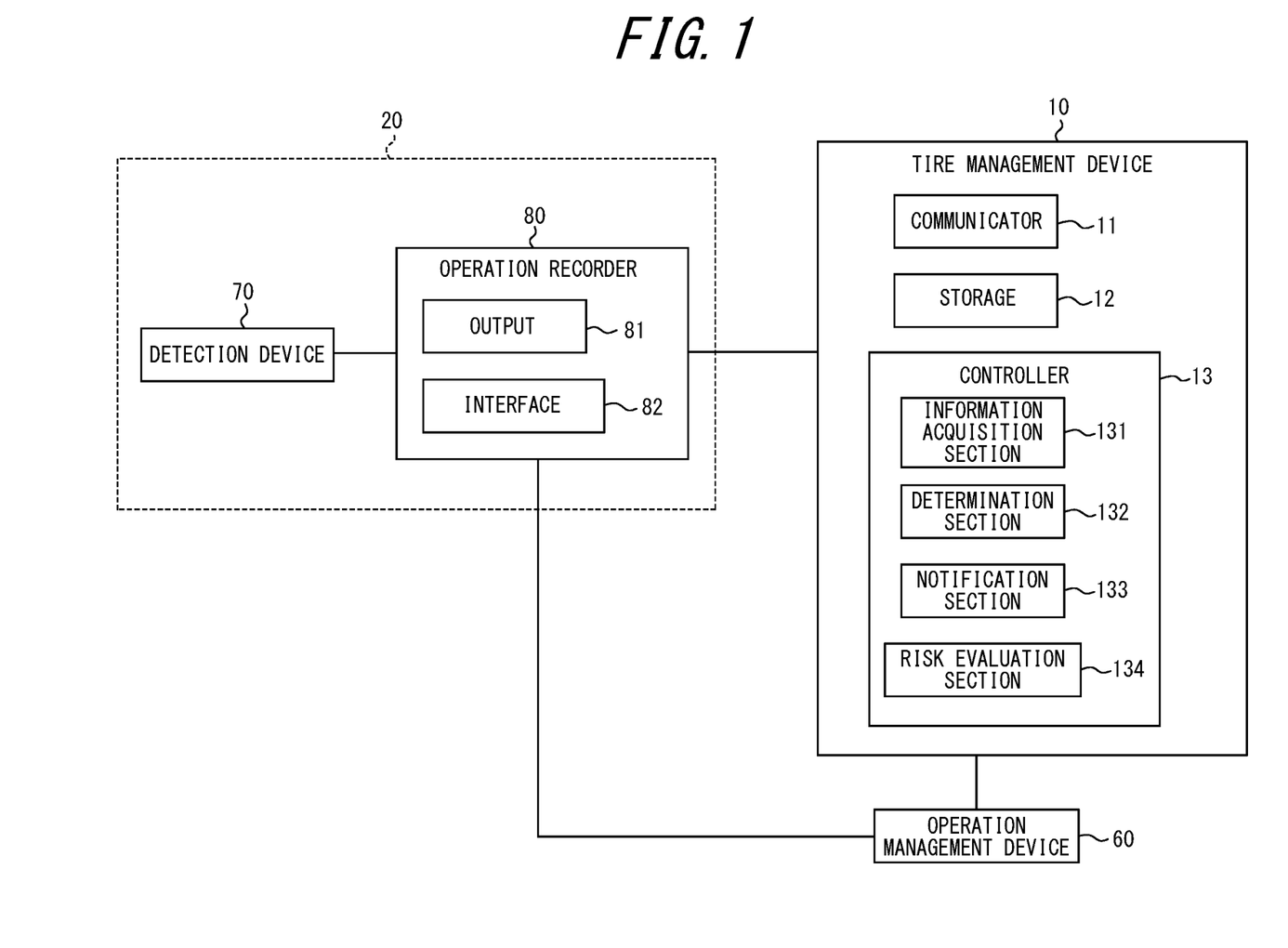
FIG. 1 is a diagram illustrating an example configuration of a tire management system including a tire management device according to an embodiment of the present disclosure.
Figure 2:
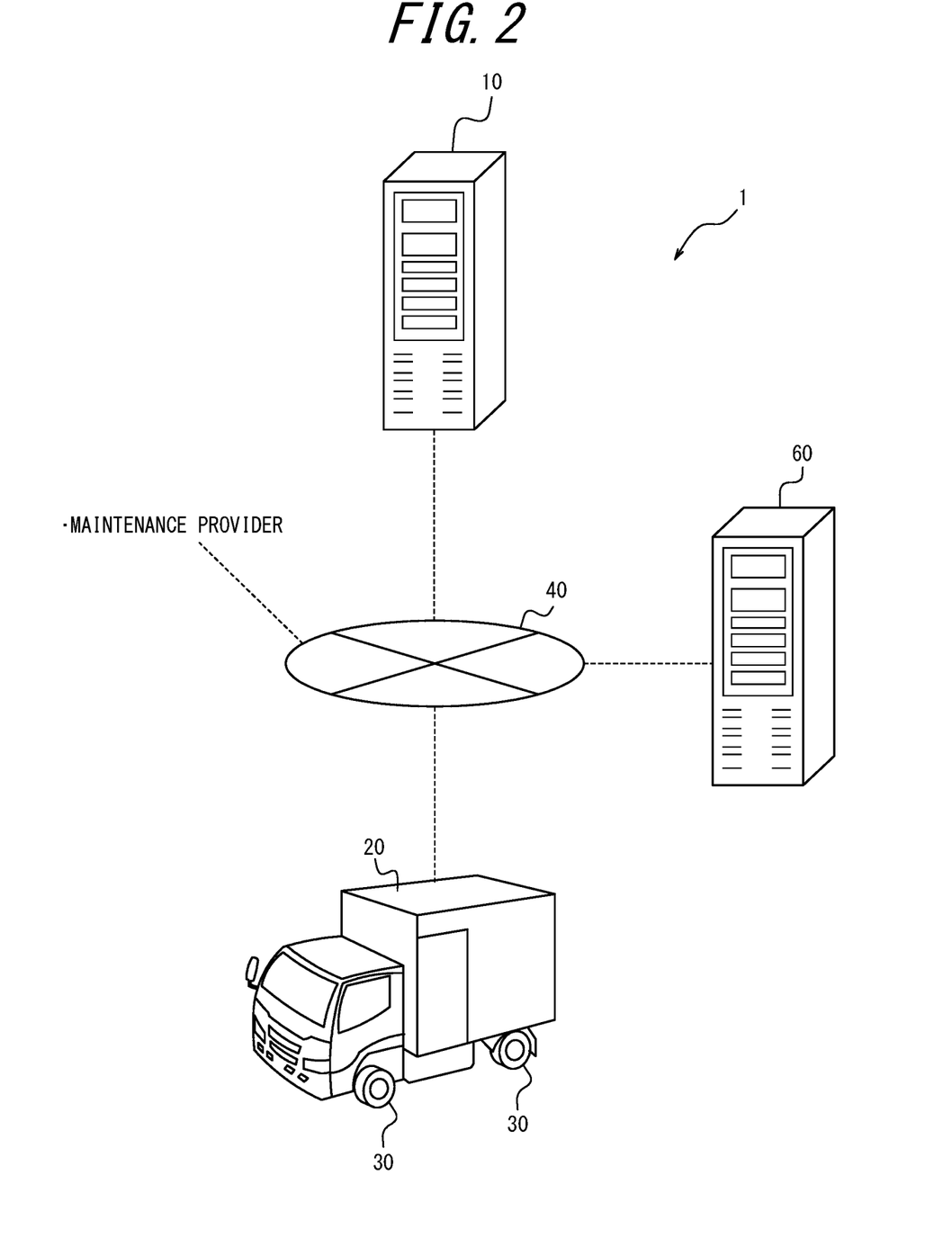
FIG. 2 is another diagram illustrating the example configuration of the tire management system illustrated in FIG. 1.

FIG. 1 and FIG. 2 illustrate an example configuration of a tire management system 1 including a tire management device 10, according to the present embodiment. FIG. 1 is a block diagram including an example internal configuration of the tire management device 10. FIG. 2 illustrates overall configuration of the tire management system 1.

The tire management device 10 detects abnormal internal pressure of tires 30 mounted on a vehicle 20, determines a degree of abnormality, and outputs a determination result to a notification destination. The tire management device 10 detects abnormal internal pressure for each of the tires 30 mounted on the vehicle 20. According to the present embodiment, the notification destination is both the vehicle 20 and an operation management device 60 that manages operations of the vehicle 20, but the notification destination is not limited to this. The notification destination may include, for example, a computer of a maintenance provider able to replace the tires 30 of the vehicle 20. Further, the notification destination may include, for example, a portable terminal device such as a smartphone owned by a driver of the vehicle 20.

Here, the tire management system 1 including the tire management device 10 manages the tires of a plurality of vehicles (the vehicle 20 and other vehicles). The vehicle 20 is one of the plurality of vehicles.

The tire management device 10 includes a communicator 11, a storage 12, and a controller 13. The controller 13 includes an information acquisition section 131, a determination section 132, a notification section 133, and a risk evaluation section 134. The tire management device 10 may be a computer, such as a server, as a hardware structure. Details of components of the tire management device 10 are described below.

The tire management device 10, together with the operation management device 60 connected by a network 40, may constitute the tire management system 1. The network 40 is, for example, the Internet, but may be a local area network (LAN). The tire management system 1 may further include a computer of a maintenance provider connected by the network 40.

The operation management device 60 is a device that manages the operation status of a plurality of vehicles, including the vehicle 20. The operation management device 60 acquires information such as speed, travel time, running distance, and the like for the plurality of vehicles, including the vehicle 20, and manages the plurality of vehicles. The plurality of vehicles may be trucks, for example, but are not limited to any particular type of vehicle. According to the present embodiment, the plurality of vehicles (including the vehicle 20) managed by the operation management device 60 are trucks used for transportation. The operation management device 60 may also manage the travel routes of the plurality of vehicles, including the vehicle 20. A manager of the operation management device 60 is able to provide an audio notification to a driver of the vehicle 20. For example, an audio notification or voice communication function of an operation recorder 80, described below, allows the manager to call the driver of the vehicle 20 to halt vehicle operation, or the like.

The vehicle 20 includes an in-vehicle device able to connect to the network 40 to send and receive data. According to the present embodiment, the vehicle 20 includes the operation recorder 80 that is able to connect to the network 40. Further, the vehicle 20 includes a detection device 70 that detects mounted tire information that is information about the properties and state of the tires 30 mounted on the vehicle 20 during travel. The tire management device 10 is able to acquire the mounted tire information detected by the detection device 70 via the operation recorder 80 and the network 40.

The detection device 70 is a device or system that includes a sensor and generates the mounted tire information. The detection device 70 may be a single device or a plurality of devices. According to the present embodiment, the detection device 70 includes a tire pressure monitoring system (TPMS). The detection device 70 may include a device or system other than the tire pressure monitoring system. Here, a device or system included in the detection device 70 may have any publicly available configuration.

The tire pressure monitoring system monitors the internal pressures of the tires 30 mounted on the vehicle 20. The tire pressure monitoring system may include, for example, sensors installed inside the tires 30, a processor that determines changes in air pressure based on sensor detection values, and a memory that stores sensor detection values and the like. Sensors may include pressure sensors and temperature sensors. According to the present embodiment, the tire pressure monitoring system outputs information on the internal pressure and temperature of the tires 30 mounted on the vehicle 20 to the tire management device 10 via the operation recorder 80 as the mounted tire information. Here, as another example, the mounted tire information need not include temperature information.

Figure 3:
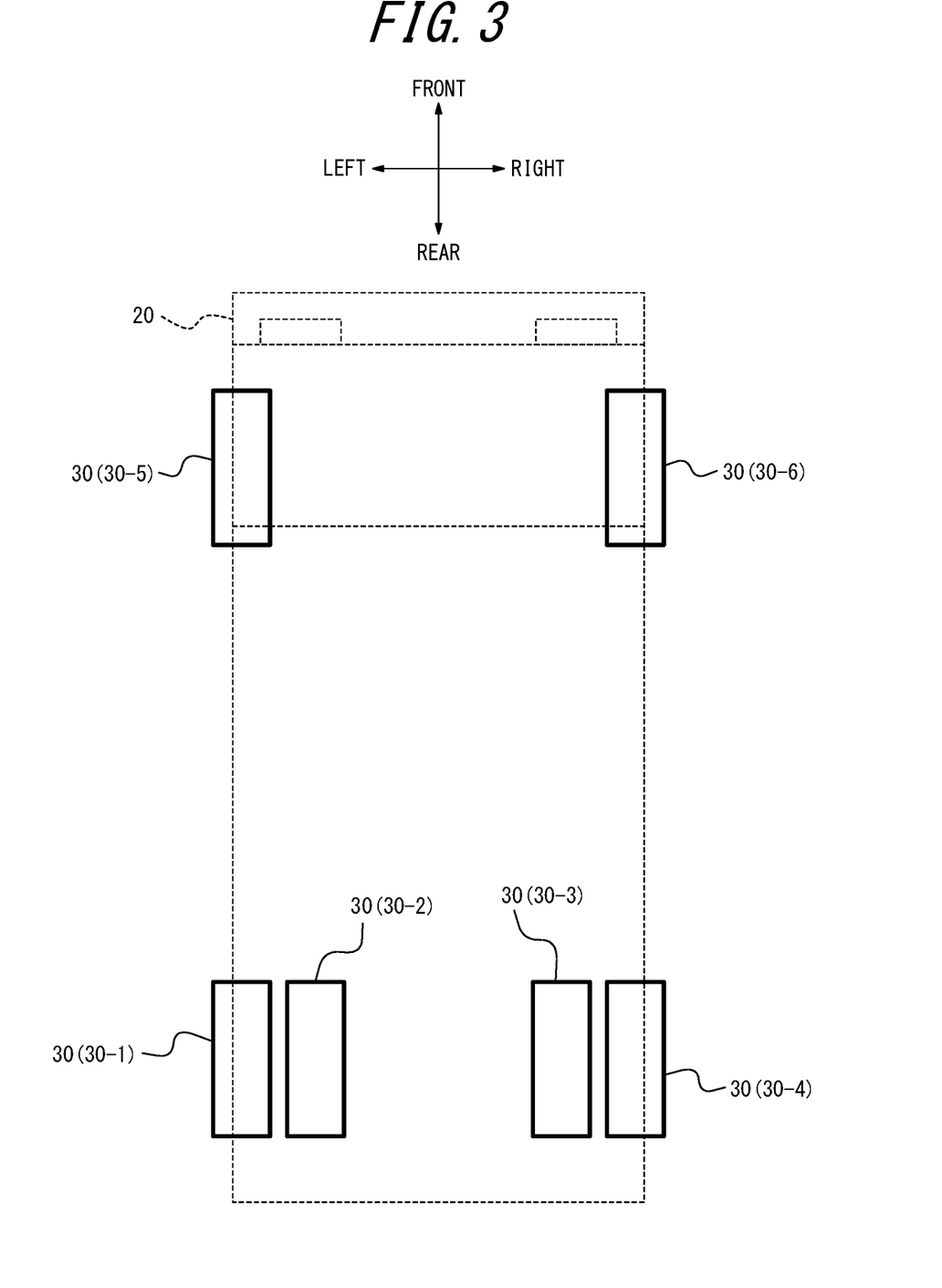
FIG. 3 is a diagram for explanation of mounted positions of tires.

Here, the tire pressure monitoring system monitors the internal pressure of all the tires 30 mounted on the vehicle 20. The tire pressure monitoring system outputs information on the internal pressure and temperature of each of the tires 30 to the tire management device 10 in association with mounted position information. The mounted position information indicates the mounted position of each of the tires 30 on the vehicle 20. As illustrated in FIG. 3, the vehicle 20 that is a truck includes, for example, four tires 30-1, 30-2, 30-3, 30-4 of rear wheels and two tires 30-5, 30-6 of front wheels. In the example in FIG. 3, the rear left dual wheels include the tires 30-1 and 30-2. The rear right dual wheels include the tires 30-3 and 30-4. For example, the mounted position information for the tire 30-1 may be "rear left outside wheel". For example, the mounted position information for the tire 30-3 may be "rear right inside wheel". For example, the mounted position information for the tire 30-5 may be "front left wheel". According to the present embodiment, the mounted position information is output to the tire management device 10 together with the mounted tire information. Here, the vehicle 20 is not limited to a two-axle vehicle that has two axles as illustrated in FIG. 3, and may be a multi-axle vehicle with three, four, or even more axles, for example.

Further, the processor of the tire pressure monitoring system may generate load information for the vehicle 20 based on the information of the internal pressure of the tires 30. The processor may, for example, determine that a load has been placed on the vehicle 20 that is a truck from an increase in the internal pressure of the tires 30, and calculate the weight of the load. According to the present embodiment, the load information of the vehicle 20 is output to the tire management device 10 along with the mounted tire information.

Further, upon determining that an abnormal internal pressure has occurred in the tires 30 based on the information of the internal pressure of the tires 30, the processor of the tire pressure monitoring system may generate an abnormal internal pressure determination signal and include the abnormal internal pressure determination signal in the mounted tire information. The processor of the tire pressure monitoring system may execute the determination of abnormality using a known method such as determining that a rate of change in internal pressure exceeds a threshold value, for example. Here, the processor of the tire pressure monitoring system is not highly accurate in determining abnormality, and the tire management device 10 performs highly accurate determination of the presence or absence of abnormal internal pressure. The abnormal internal pressure determination signal may be used, for example, as a trigger for the tire management device 10 to execute determination of abnormal internal pressure. Further, a determination of a pressure drop rate of internal pressure of the tires 30 may be executed outside of the tire pressure monitoring system.

The operation recorder 80 is an in-vehicle device that outputs information such as the speed, the travel time, and the running distance of the vehicle 20 to the operation management device 60. According to the present embodiment, the operation recorder 80 is a digital tachograph, but is not limited to a digital tachograph. Further, the operation recorder 80 outputs to the tire management device 10 the mounted position information, the mounted tire information, and the load information generated by the detection device 70. The operation recorder 80 may acquire information such as the speed, the travel time, and the running distance of the vehicle 20 from an electronic control unit (ECU) of the vehicle 20 via an in-vehicle network such as a controller area network (CAN), for example. Further, the operation recorder 80 may output information on the current position of the vehicle 20 to the tire management device 10 and the operation management device 60. The operation recorder 80 may be equipped with Global Positioning System (GPS) functionality, and may acquire information on the current position from another in-vehicle device with GPS functionality via a CAN.

The operation recorder 80 may include, for example, an output 81 and an interface 82. The output 81 outputs information such as the speed, the travel time, and the running distance of the vehicle 20 to the operation management device 60, and outputs the mounted position information, the mounted tire information, and the load information to the tire management device 10. The interface 82 enables voice communication between a driver and the manager of the operation management device 60, and includes, for example, a microphone and a speaker. Further, the interface 82 includes a display device such as a display. The manager of the operation management device 60 may cause the display device to display a warning or the like to prompt a driver to take action.

According to the present embodiment, the operation recorder 80 executes data input from the tire management device 10 via the interface 82. In other words, the operation recorder 80 is used as an interface for a notification destination (the vehicle 20) to which the tire management device 10 sends an abnormal internal pressure determination result and the like. According to the present embodiment, the interface 82 of the operation recorder 80 receives the abnormal internal pressure determination result and the like from the tire management device 10. Further, the interface 82 includes at least one of a warning lamp or a warning speaker that outputs an alarm to a driver in response to notification of abnormal internal pressure of the tires 30. In such a case, the operation recorder 80 may include an output stop indicator so that a driver may stop the alarm.

Further, as illustrated in FIG. 2, the tire management device 10 may transmit information to a maintenance provider via the network 40. The tire management device 10 may, for example, notify a maintenance provider prior to arrival of the vehicle 20 so that a tire with abnormal internal pressure among the tires 30 may be replaced as soon as possible. The tire management device 10 may select a maintenance provider closest to the vehicle 20 based on the information of the current position of the vehicle 20 acquired from the operation recorder 80, and notify the selected maintenance provider for emergency replacement of a tire among the tires 30. Further, the tire management device 10 may acquire information about the road, such as map information, via the network 40, in order to select a maintenance provider, for example. Aside from a maintenance provider, a transmission destination of information may include a store, a road service, and the like that are set in advance for each vehicle operations manager that is an owner of the operation management device 60.

The following is a detailed description of components of the tire management device 10. The communicator 11 includes at least one communication module configured to connect to the network 40. The communicator 11 may include, for example, a communication module compatible with a mobile communication standard such as 4G (fourth generation) or 5G (fifth generation). The communicator 11 may include, for example, a communication module compatible with a wired LAN standard (1000 BASE-T as an example). The communicator 11 may include, for example, a communication module compatible with a wireless LAN standard (IEEE 802.11 as an example).

The storage 12 includes at least one memory. The memory may be any memory, including but not limited to semiconductor memory, magnetic memory, or optical memory, for example. The storage 12 may be built into the tire management device 10, for example, and may be configured to be accessed externally from the tire management device 10 via any interface.

The storage 12 stores varied data used in various calculations executed by the controller 13. Further, the storage 12 may store results and intermediate data of various calculations executed by the controller 13.

According to the present embodiment, the storage 12 stores a vehicle management database, the map information described above, and the like, used in the determination of abnormal internal pressure of the tires 30 by the determination section 132, evaluation by the risk evaluation section 134, and the like. The map information may be acquired via the network 40 and stored in the storage 12. Details of the vehicle management database are described below.

The controller 13 is at least one processor. The processor may be, but is not limited to, a general-purpose processor or a dedicated processor specialized for particular processing, and may be any processor. The controller 13 controls overall operation of the tire management device 10.

Here, the tire management device 10 may have the following software configuration. At least one program used to control operation of the tire management device 10 is stored in the storage 12. The program stored in the storage 12, when read by the processor of the controller 13, causes the controller 13 to function as the information acquisition section 131, the determination section 132, the notification section 133, and the risk evaluation section 134.

The information acquisition section 131 acquires the mounted position information and the mounted tire information. Further, the information acquisition section 131 acquires the load information, the map information, and the like. The information acquisition section 131 stores the map information acquired in the storage 12. Further, in order to manage information acquired for each vehicle, the information acquisition section 131 generates or updates the vehicle management database and stores the vehicle management database in the storage 12.

Figure 4:
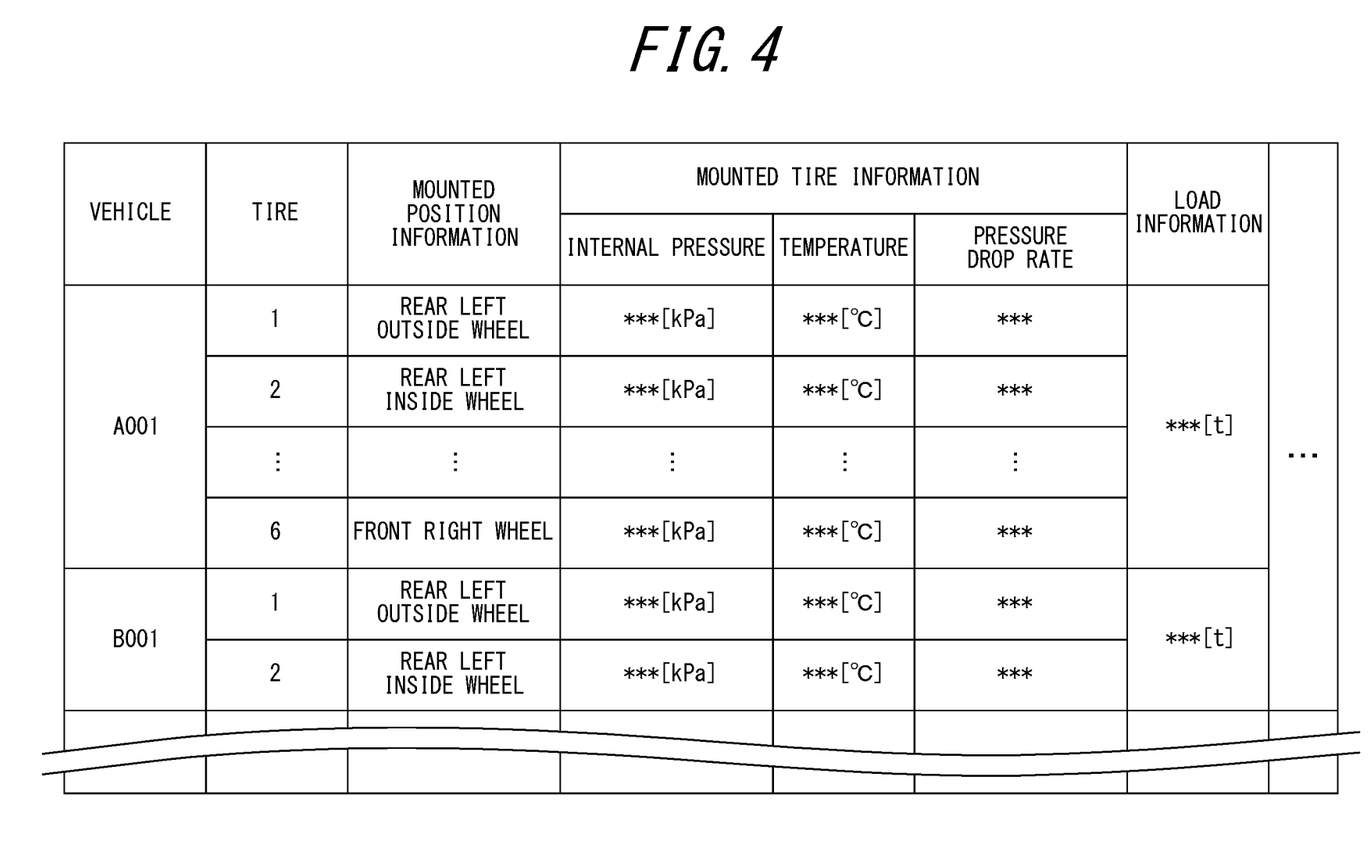
FIG. 4 is a diagram illustrating a vehicle management database stored in a storage of the tire management device.

FIG. 4 is a diagram illustrating the vehicle management database stored in the storage 12. The mounted position information, the mounted tire information, and the load information acquired by the information acquisition section 131 are associated with each tire of each of the plurality of vehicles in the vehicle management database. In the example illustrated in FIG. 4, vehicles are distinguished by identifiers such as A001 and B001. Each of the plurality of vehicles has six tires mounted (see FIG. 3) that are distinguished by identifiers 1 to 6 with position specified by the mounted position information. Internal pressure and temperature are values measured for each tire by the tire pressure monitoring system. Although listed as single values in FIG. 4, internal pressure and temperature are stored in the storage 12 as time-series data corresponding to measurement time. Here, for each tire, the pressure drop rate is a speed at which the internal pressure of the tire decreases, and is calculated by the determination section 132 based on the time series data of the internal pressure. Among entries in the vehicle management database, the pressure drop rate is calculated and managed by the determination section 132. The load information is the load carried for each vehicle. The load information may be overwritten and updated with the latest values.

Here, the information acquisition section 131 may acquire a travel route from the operation management device 60. A travel route acquired may be associated with the map information stored in the storage 12 and managed by the vehicle management database.

The determination section 132 determines abnormal internal pressure of the tires 30 based on the mounted tire information. The determination section 132 may, for example, start determination of abnormal internal pressure of the tires 30 when mounted tire information including an abnormal internal pressure determination signal is acquired by the information acquisition section 131. According to the present embodiment, the determination section 132 first specifies the identifier of a specific tire 30 of the vehicle 20 that is a subject of determination. The determination section 132 reads the vehicle management database from the storage 12 and extracts the mounted position information and the mounted tire information of the tire 30 based on the identifier. The determination section 132 determines abnormal internal pressure of the tire 30 based on the internal pressure and the temperature of the mounted tire information. Here, the temperature is used in temperature compensation to convert the internal pressure of the tire 30 to a value at a specific temperature. A known method may be used for temperature compensation. The determination section 132 may, for example, determine that the tire 30 has abnormal internal pressure when the internal pressure of the tire 30 after compensation is less than a reference value. The reference value may be a constant value, and may be a different value for different types of the tires 30. Further, a method for determining the presence or absence of abnormal internal pressure is not limited to use of the reference value, and may be any other known method.

When the tire 30 has an abnormal internal pressure, the determination section 132 determines the degree of the abnormal internal pressure. The degree of the abnormal internal pressure is divided into three classifications according to the present embodiment, but the number of classifications is not limited to three. A first classification is a state that requires emergency maintenance to replace the tire 30, such as a puncture. Hereinafter, the first classification is also referred to as "puncture". When the abnormal internal pressure is that of a puncture, the risk of continued operation of the vehicle 20 is high, and stopping and calling for road service is preferable. A second classification is a state where the tire 30 is deflating at a rate faster than natural pressure drop, although not as fast as a puncture, such as a case of a sharp object such as a nail being stuck in the tire and not released or in a case of a valve failure. Hereinafter, the second classification is also referred to as "slow leak". When the abnormal internal pressure is that of a slow leak, the risk of continued operation of the vehicle 20 is moderate, and travel to a maintenance provider may be possible. A third classification is a state where the tire 30 is deflating at approximately the same rate as natural pressure drop. Hereinafter, the third classification is also referred to as "natural pressure drop". When the abnormal internal pressure is that of a natural pressure drop, the risk of continued operation of the vehicle 20 is low and continued vehicle operation is basically possible.

When the tire 30 has an abnormal internal pressure, the determination section 132 determines the degree of the abnormal internal pressure based on the value of the internal pressure of the tire 30. For example, when the internal pressure of the tire 30 is significantly low, the determination section 132 is able to determine that the abnormal internal pressure is that of a puncture. However, determining the classification based solely on the value of the internal pressure of the tire 30 may be difficult. The determination section 132 may determine the degree of the abnormal internal pressure of the tire 30 based on the value of the internal pressure of the tire 30 and the pressure drop rate. The determination section 132 may calculate the pressure drop rate based on the time series data of the internal pressure and determine whether the abnormal internal pressure is that of a puncture, slow leak, or natural pressure drop based on the pressure drop rate. Further, the determination section 132 may determine the pressure drop rate by comparing the internal pressure change with other tires on the same axle, for example. The vehicle 20 and the operation management device 60 are notified of the degree of abnormal internal pressure determined as the abnormal internal pressure determination result, together with the mounted position information of the tire 30 that has been determined to have an abnormal internal pressure. A driver of the vehicle 20 and a manager of the operation management device 60 are not simply notified that there is abnormal internal pressure, as in conventional technology, but receive information on the degree of the abnormal internal pressure and the mounted position, making judging whether vehicle operation may continue easier. For example, when a driver or manager is only notified of abnormal internal pressure using conventional technology, the driver or manager has little choice but to stop the vehicle promptly in order to prevent an accident. According to the present embodiment, a driver or manager may judge, for example, that vehicle operation may be able to continue to a nearby maintenance provider based on the information that the degree of abnormal internal pressure in the tire 30 is that of a slow leak and the mounted position is an inside wheel of a dual wheel.

Here, the risk of continued operation of the vehicle 20 may vary depending on the state of the vehicle 20 and the tire 30 in which abnormal internal pressure occurred. The risk evaluation section 134 evaluates the risk of continued travel of the vehicle 20 based on the mounted position and the abnormal internal pressure determination result of the tire 30 that has been determined to have an abnormal internal pressure. Here, the abnormal internal pressure determination result is the degree of the abnormal internal pressure determined by the determination section 132.

The risk evaluation section 134 first evaluates the magnitude of risk according to the degree of the abnormal internal pressure. That is, the risk evaluation section 134 evaluates the risk as high, moderate, or low when the degree of abnormal internal pressure is that of a puncture, slow leak, or natural pressure drop, respectively. Hereinafter, an evaluation based solely on the degree of the abnormal internal pressure may be referred to as an "initial evaluation". The risk evaluation section 134 further takes into account other factors to alter the risk evaluation. The risk evaluation section 134 evaluates risk as high when, for example, the mounted position of the tire 30 in which the abnormal internal pressure occurred is not an inside wheel of a dual wheel (rear left inside wheel or rear right inside wheel). In other words, the risk evaluation section 134 maintains the "initial evaluation" when, for example, the mounted position of the tire 30 in which the abnormal internal pressure occurred is an inside wheel of a dual wheel, and otherwise sets the evaluation to "high risk".

Further, the risk evaluation section 134 may set the evaluation to "high risk" upon determining from the load information of the vehicle 20 that the vehicle 20 is heavier than a defined weight. Further, the risk evaluation section 134 may set the evaluation to "high risk" when an estimated distance to a destination is longer than a defined distance or when an estimated time to the destination is longer than a defined time, based on the travel route of the vehicle 20. Further, the risk evaluation section 134 may set the evaluation to "high risk" when the vehicle 20 is scheduled to use a highway, based on the travel route of the vehicle 20. The vehicle 20 and the operation management device 60 are notified of the evaluation by the risk evaluation section 134. A driver of the vehicle 20 and a manager of the operation management device 60 may refer to the objective risk evaluation to judge whether or not to continue appropriate vehicle operation.

In the same example as above, suppose that a driver and a manager receive information that the degree of abnormal internal pressure in the tire 30 is that of a slow leak and the mounted position is an inside wheel of a dual wheel, and the risk evaluation section 134 evaluates the risk as "high risk" because vehicle 20 is heavier than the defined weight. At this time, the driver and the manager are also notified of the "high risk" evaluation, allowing review of the continuation of vehicle operation.

The notification section 133 outputs the mounted position and the abnormal internal pressure determination result of the tire 30 that has been determined to have an abnormal internal pressure to the vehicle 20 and the operation management device 60, which are the notification destinations. Further, the notification section 133 outputs the evaluation by the risk evaluation section 134 to the vehicle 20 and the operation management device 60, which are the notification destinations.

Here, a final decision to continue or stop operation of the vehicle 20 may be made by a manager of the operation management device 60. Continuing to notify the vehicle 20 after a final decision has been made may cause driver anxiety due to alarms such as a warning lamp, for example. The notification section 133 stops output to the vehicle 20 upon acquiring a signal from the operation management device 60 indicating that a response to the abnormal internal pressure of the tire 30 has been decided. Such a stop to processing may eliminate driver anxiety caused by continuation of an alarm based on a notification.

The notification section 133 may further change at least one of notification method or notification interval based on the evaluation by the risk evaluation section 134. The notification section 133 may, for example, shorten the notification interval when the evaluation is "high risk" and repeat the notification until a command to stop is received from the notification destination. Further, the notification section 133 may, for example, cause an alarm to be executed using a combination of a warning lamp and a warning speaker when the evaluation is "high risk". The notification section 133 may, for example, increase the notification interval to, for example, once every 30 minutes when the evaluation is "moderate risk". Further, the notification section 133 may, for example, cause an alarm to be executed using only a warning lamp when the evaluation is "moderate risk". Further, the notification section 133 may alter the content of the alarm emitted from the warning speaker according to the evaluation.

Figure 5:
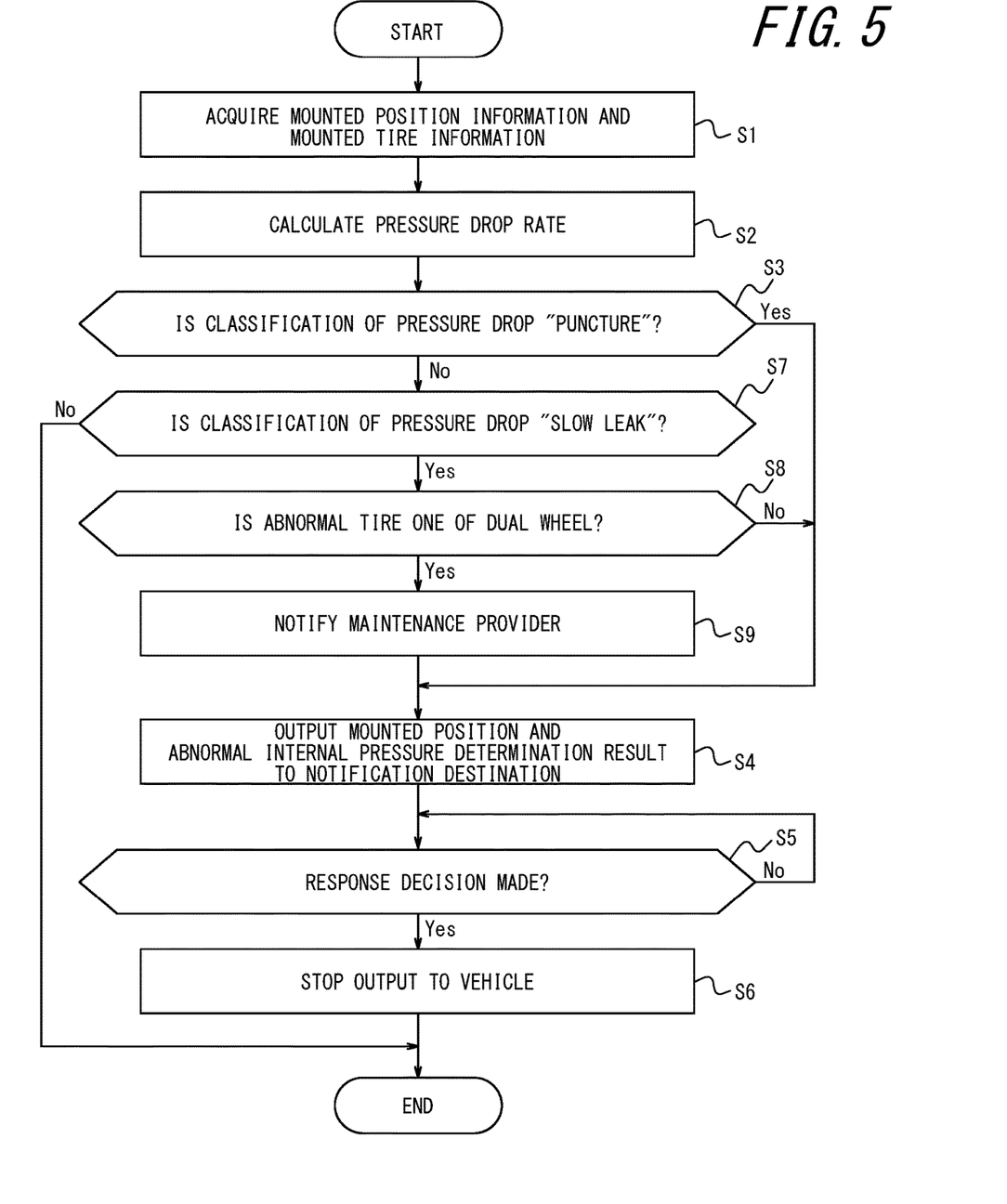
FIG. 5 is a flowchart illustrating an example of a tire management method according to an embodiment of the present disclosure.

FIG. 5 is a flowchart illustrating a tire management method executed by the tire management device 10 according to the present embodiment.

The information acquisition section 131 acquires the mounted position information and the mounted tire information (step S1). The determination section 132 then determines the abnormal internal pressure of the tire 30 based on the mounted tire information.

The determination section 132 calculates the pressure drop rate of the internal pressure of the tire 30 (step S2). Here, the calculation of the pressure drop rate of the internal pressure by the determination section 132 is not limited to execution only upon determination of abnormal internal pressure. For example, even before the internal pressure of the tire 30 falls below the defined threshold, detection of a state such as a high rate of pressure drop of the internal pressure of the tire 30 may be possible.

When the determination section 132 determines by the pressure drop rate that the classification of the degree of the abnormal internal pressure is "puncture" (Yes in step S3), the notification section 133 outputs the mounted position and the abnormal internal pressure determination result of the tire 30 that has been determined to have an abnormal internal pressure to the notification destination (step S4). Here, the abnormal internal pressure determination result is the classification "puncture". At this time, the risk of continued operation of the vehicle 20 is high and stopping and calling for road service is preferable.

The notification section 133 continues outputting (No in step S5) until a final decision is made by a manager of the operation management device 60 to continue or stop operation of the vehicle 20.

When a decision is made by the manager of the operation management device 60 (Yes in step S5), the notification section 133 stops output to the vehicle 20 (step S6). In a case where the interface 82 of the operation recorder 80 indicates an alarm to a driver, the operation recorder 80 may include an output stop indicator so that the driver may stop the alarm.

When the determination section 132 determines by the pressure drop rate that the classification of the degree of the abnormal internal pressure is not "puncture" (No in step S3), the processing of step S7 is executed.

When the determination section 132 determines by the pressure drop rate that the classification of the degree of the abnormal internal pressure is "slow leak" (Yes in step S7), the risk evaluation section 134 executes risk evaluation based on whether the abnormal tire is one of a dual wheel (step S8).

When the abnormal tire is one of a dual wheel (Yes in step S8), the risk evaluation section 134 evaluates the risk as moderate. The vehicle 20 may continue to operate, and therefore the notification section 133 notifies the maintenance provider of necessary information prior to the arrival of the vehicle 20 so that the tire 30 with the abnormal internal pressure may be replaced promptly (step S9). The necessary information may include at least one of the following: the mounted position information of the abnormal tire, the mounted tire information, the identifier of the vehicle 20, GPS or other position information of the vehicle 20, vehicle manager information, the load information, and estimated time of arrival. The mounted tire information may include tire size, tire type, and the like of the tire 30.

After step S9, or when the abnormal tire is not one of a dual wheel (No in step S8), the notification section 133 outputs the mounted position and the abnormal internal pressure determination result of the tire 30 that has been determined to have an abnormal internal pressure to the notification destination (step S4). Here, the abnormal internal pressure determination result is the classification "slow leak". Steps S5 and S6 are then executed as explained above.

Further, when the determination section 132 determines by the pressure drop rate that the classification of the degree of the abnormal internal pressure is not "slow leak" (No in step S7), that is, the classification of the degree of the abnormal internal pressure is "natural pressure drop", the series of processing ends without executing a notification and the like. As another example, the processing from step S4 to step S6 may be executed even when the classification of the degree of the abnormal internal pressure is "natural pressure drop". Information sharing with a manager of the operation management device 60 may be achieved by the tire management device 10 designating a specific website as the notification destination and the manager accessing the website. In such a case, a manager of the operation management device 60 is able to obtain information even when no abnormality has occurred, and is able to check the status of each vehicle (including that there is no abnormality).

As described above, the tire management device 10 and the tire management method according to the present embodiment are capable of notification of an abnormal tire internal pressure such that judging whether or not vehicle operation may continue is made easier.

Although an embodiment of the present disclosure has been described based on the drawings and examples, it should be noted that a person skilled in the art may make variations and modifications based on the present disclosure. Therefore, it should be noted that such variations and modifications are included within the scope of the present disclosure. For example, functions and the like included in each component and step may be rearranged, and a plurality of components and steps may be combined into one or divided, as long as no logical inconsistency results. The embodiment according to the present disclosure may be realized as a program executed by a processor provided to a device or as a storage medium on which the program is stored. The scope of the present disclosure should be understood to include these examples.

REFERENCE SIGNS LIST 1 tire management system
10 tire management device
11 communicator
12 storage
13 controller
20 vehicle
30 tire
40 network
60 operation management device
70 detection device
80 operation recorder
81 output
82 interface
131 information acquisition section
132 determination section
133 notification section
134 risk evaluation section

The invention claimed is:

1. A tire management device comprising:
an information acquisition section configured to acquire mounted position information indicating a mounted position of a tire on a vehicle and mounted tire information that is information on the state of the tire, including internal pressure;
a determination section configured to determine abnormal internal pressure of the tire based on the mounted tire information;
a notification section configured to output the mounted position and an abnormal internal pressure determination result of the tire that has been determined to have an abnormal internal pressure to a notification destination; and
a risk evaluation section configured to execute an evaluation of risk of continued travel of the vehicle based on the mounted position and the abnormal internal pressure determination result of the tire that has been determined to have an abnormal internal pressure, wherein
the notification section is configured to output the evaluation, wherein
the risk evaluation section changes the evaluation from the evaluation based solely on the degree of the abnormal internal pressure in the following cases:
if the mounted position of the tire in which the abnormal internal pressure occurred is not an inside wheel of a dual wheel,
if the vehicle is heavier than a defined weight,
if an estimated distance to a destination is longer than a defined distance,
if an estimated time to the destination is longer than a defined time, or
if the vehicle is scheduled to use a highway.

2. The tire management device according to claim 1, wherein the determination section is configured to determine a degree of abnormal internal pressure of the tire based on a value of the internal pressure of the tire or a value of the internal pressure and a pressure drop rate of the tire.

3. The tire management device of claim 1, wherein the notification destination includes the vehicle and an operation management device configured to manage operation of the vehicle, and
the notification section stops output to the vehicle upon acquiring a signal from the operation management device indicating that a response to the abnormal internal pressure of the tire has been decided.

4. A non-transitory computer-readable recording medium including computer program instructions that causes a tire management device to execute:
acquiring mounted position information indicating a mounted position of a tire on a vehicle and mounted tire information that is information on the state of the tire, including internal pressure;
determining abnormal internal pressure of the tire based on the mounted tire information;
outputting the mounted position and an abnormal internal pressure determination result of the tire that has been determined to have an abnormal internal pressure to a notification destination; and
evaluating of risk of continued travel of the vehicle based on the mounted position and the abnormal internal pressure determination result of the tire that has been determined to have an abnormal internal pressure, wherein the outputting includes outputting the evaluation, wherein the evaluating includes changing the evaluation from the evaluation based solely on the degree of the abnormal internal pressure in the following cases:

if the mounted position of the tire in which the abnormal internal pressure occurred is not an inside wheel of a dual wheel, if the vehicle is heavier than a defined weight, if an estimated distance to a destination is longer than a defined distance, if an estimated time to the destination is longer than a defined time, or if the vehicle is scheduled to use a highway.

5. A tire management method executed by a tire management device, the tire management method comprising:

acquiring mounted position information indicating a mounted position of a tire on a vehicle and mounted tire information that is information on the state of the tire, including internal pressure;

determining abnormal internal pressure of the tire based on the mounted tire information;

outputting the mounted position and an abnormal internal pressure determination result of the tire that has been determined to have an abnormal internal pressure to a notification destination; and evaluating of risk of continued travel of the vehicle based on the mounted position and the abnormal internal pressure determination result of the tire that has been determined to have an abnormal internal pressure, wherein the outputting includes outputting the evaluation, wherein the evaluating includes changing the evaluation from the evaluation based solely on the degree of the abnormal internal pressure in the following cases:

if the mounted position of the tire in which the abnormal internal pressure occurred is not an inside wheel of a dual wheel, if the vehicle is heavier than a defined weight, if an estimated distance to a destination is longer than a defined distance, if an estimated time to the destination is longer than a defined time, or if the vehicle is scheduled to use a highway.

6. The tire management device of claim 2, wherein the notification destination includes the vehicle and an operation management device configured to manage operation of the vehicle, and the notification section stops output to the vehicle upon acquiring a signal from the operation management device indicating that a response to the abnormal internal pressure of the tire has been decided.

* * * * *